United States Patent

Alden et al.

[11] Patent Number: 5,074,654
[45] Date of Patent: Dec. 24, 1991

[54] HYDRAULIC ACTUATORS FOR OPTICAL SYSTEMS

[75] Inventors: Frank Alden, Marlboro; John D. Genova, Needham, both of Mass.

[73] Assignee: Litton Systems, Inc., Lexington, Mass.

[21] Appl. No.: 570,750

[22] Filed: Aug. 22, 1990

[51] Int. Cl.$^5$ .............................................. G02B 7/18
[52] U.S. Cl. .................................. 359/849; 60/545; 60/583; 359/846
[58] Field of Search ............... 350/607, 609, 610, 611; 60/533, 545, 583

[56] References Cited

U.S. PATENT DOCUMENTS

| | | | |
|---|---|---|---|
| 3,071,930 | 1/1963 | Moulin | 60/533 |
| 4,492,431 | 1/1985 | Eitel et al. | 350/611 |
| 4,655,563 | 4/1987 | Plante et al. | 350/607 |
| 4,674,848 | 6/1987 | Aldrech et al. | 350/611 |
| 4,775,230 | 10/1988 | Meier | 350/607 |
| 4,861,149 | 8/1989 | Ealey | 350/611 |

Primary Examiner—Bruce Y. Arnold
Assistant Examiner—J. P. Ryan
Attorney, Agent, or Firm—Michael H. Wallach; Robert F. Rotella

[57] ABSTRACT

Hydraulic actuators are disclosed which are useful for controlling the reflecting surface of deformable mirrors or positioning the segments a segmented reflecting mirror. In one embodiment electrodistortive actuators are used to control movement of a piston into or out of a reservoir containing a fluid. The fluid controls movement of a second, smaller piston whose movement may be coupled to a surface whose shape or position it is desired to influence. In a second preferred embodiment two sets of actuators are used to permit the disclosed mechanism to impart movement in two directions to the reflecting surface or optical element whose shape or position it is desired to control.

5 Claims, 1 Drawing Sheet

HYDRAULIC ACTUATORS FOR OPTICAL SYSTEMS

BACKGROUND OF THE INVENTION

1. Field of the Invention

This invention relates to reflecting mirrors used in optical systems in general and, in particular, to a form of actuator which may be used to correct the pointing direction of a mirror or other optical component and/or to induce distortions in the reflecting surface of a mirror, for example, in a deformable mirror.

2. Summary of the Prior Art

The use of electrodistortive actuators, for example actuators made of stacks of lead magnesium niobate interleaved with electrically conducting planes, is known in the prior art. Devices of the foregoing construction are useful for positioning segments of a segmented mirror to insure that the optical reflecting surface of the mirror does not have any discontinuities and that the reflecting surfaces of all elements comprising the mirror are uniformly directed toward a common location. Additional uses for such devices are in deformable mirrors where it is desired to introduce known distortions into an optical reflecting surface to either correct aberrations resulting from an incoming signal passing through a distorting medium, for example the Earth's atmosphere, or to introduce known distortions into an optical signal, for example a laser beam, prior to transmitting it through an optically distorting medium. Examples of applications in which electrodistortive actuators are used for distorting or changing the position of reflecting surfaces may be had by reference to U.S. Pat. No. 4,674,848 and 4,655,563 owned by the owner of the present invention and the teachings of which are incorporated herein by reference.

Electrodistortive actuators, for example actuators manufactured from stacks of lead magnesium niobate (PMN), are well-suited for use in effecting small changes to a large number of areas of a deformable mirror's reflecting surface in that they are easily manufactured with relatively small cross section, consequently permitting high density packing of the actuators. They suffer, however, from the inability to provide the large strokes required for inducing significant displacement of heavy optical components, e.g. the segments of a large, segmented astronomical telescope mirror. Simply making the stack longer to increase stroke becomes prohibitive in that long stacks tend to bend when activated against high resistive forces, i.e. stiff mirrors, and so the expected linear displacement is lessened. Thus, while PMN actuators can be controlled with a high degree of precision to produce very small movements, which is desirable when accurate control of a mirror's reflecting surface is required, they are not suitable for use in applications where large stroke is required.

SUMMARY OF THE INVENTION

Accordingly, a principal object of this invention is to provide an actuator for producing changes in the reflecting surface of a deformable mirror which will induce deformations in a stiff reflecting surface.

Another object of this invention is to provide an actuator which may be used to adjust the location of reflecting elements in a large segmented optical mirror to provide coherence between rays of light reflected from adjacent elements of the mirror's reflecting surface.

Still another object is to provide an actuator which will produce large displacement forces which may be accurately controlled by electronic control systems.

The above and other objects and advantages of the invention are achieved by utilizing a series of electrodistortive actuators acting against a piston having a large surface area to force a working fluid against a piston having a smaller area. The resulting combination is a linear displacement amplifier in which small linear motions of the large piston will produce larger linear motions of the small piston. The power output of the hydraulic actuator is greater than that of a single PMN actuator due to the displacement of the working fluid by the actuators used to move the large diameter piston. As a result, the disclosed hydraulic actuator can be used to produce large stroke deformations of optical reflecting surfaces having a high stiffness or to move optical elements (for example, the individual segments of a segmented mirror) whose mass is greater than that which may be influenced by the use of single electrodistortive actuators.

BRIEF DESCRIPTION OF THE DRAWING

The above and other objects and advantages of the invention will be appreciated after review of the detailed description of two preferred embodiments when read in conjunction with the drawing in which.

DETAILED DESCRIPTION OF A PREFERRED EMBODIMENT

Figure 1:
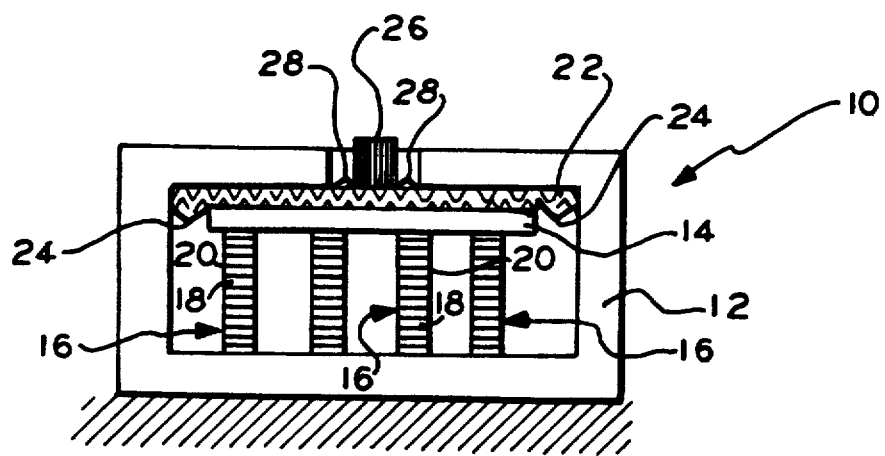
FIG. 1 is a side view in section showing a hydraulic actuator constructed in accordance with the teachings of the disclosed invention.

Referring to the drawing, FIG. 1 shows a hydraulic actuator 10 constructed in accordance with the teachings of the disclosed invention. The actuator 10 includes a frame 12 and a large diameter piston 14 supported by two or more electrodistortive actuators 16. Each actuator is composed of multiple layers 18 of electrodistortive material, for example lead magnesium niobate, (PMN), interleaved between layers of electrically-conducting material 20, for example platinum electrodes. The piston 14 presses against a working fluid contained in a chamber or reservoir 22. The space between the chamber 22 and the frame 12 is sealed by a flexible fluid seal 24 to permit movement of the piston 14 without appreciable expansion of the volume enclosed by the chamber 22. A smaller piston 26 having a surface area smaller than the piston 14 is connected to a far side of the chamber 22. A seal 28 provides a fluid-impervious seal between the piston 26 and the frame 12 to prevent fluid from escaping from the chamber 22. The electrical conducting planes 20 are connected to a controlled electrical power supply (not shown) to permit the elongation of the PMN actuators 16 in response to the application of an electric field in a manner well known in the art. Chamber 22 is filled with a relatively incompressible fluid, for example water or mercury.

Linear displacement of the small piston 26 is achieved by applying a controlled voltage to the actuators 16 to cause their elongation. Elongation of the actuators 16 results in the large piston 14 moving into the reservoir 22. Since the fluid in the chamber 22 is not compressible, the fluid forces the displacement of the small piston 26 outwardly from the chamber 22. The linear displacement of the small piston 26 is proportional to the ratio of the area of the large piston to the area of the small piston. For example, a stroke of a lead magnesium niobate actuator of 5 microns can be increased to 200 microns when the diameter of the large piston 14 is 57 mm and the diameter of the small piston 26 is 9 mm.

It will be appreciated to those skilled in the art that the displacement of the small piston 26 can be used to introduce deformation into a stiff facesheet of a deformable mirror by applying the output of the small piston 26 to the back of the deformable mirror. Similarly, the displacement of the small piston 26 can be coupled to a segment of a segmented mirror whose position it is desired to control and, by the appropriate application of electrical signals to the actuators 16, the position of each mirror segment relative to adjacent segments can be controlled.

Figure 2:
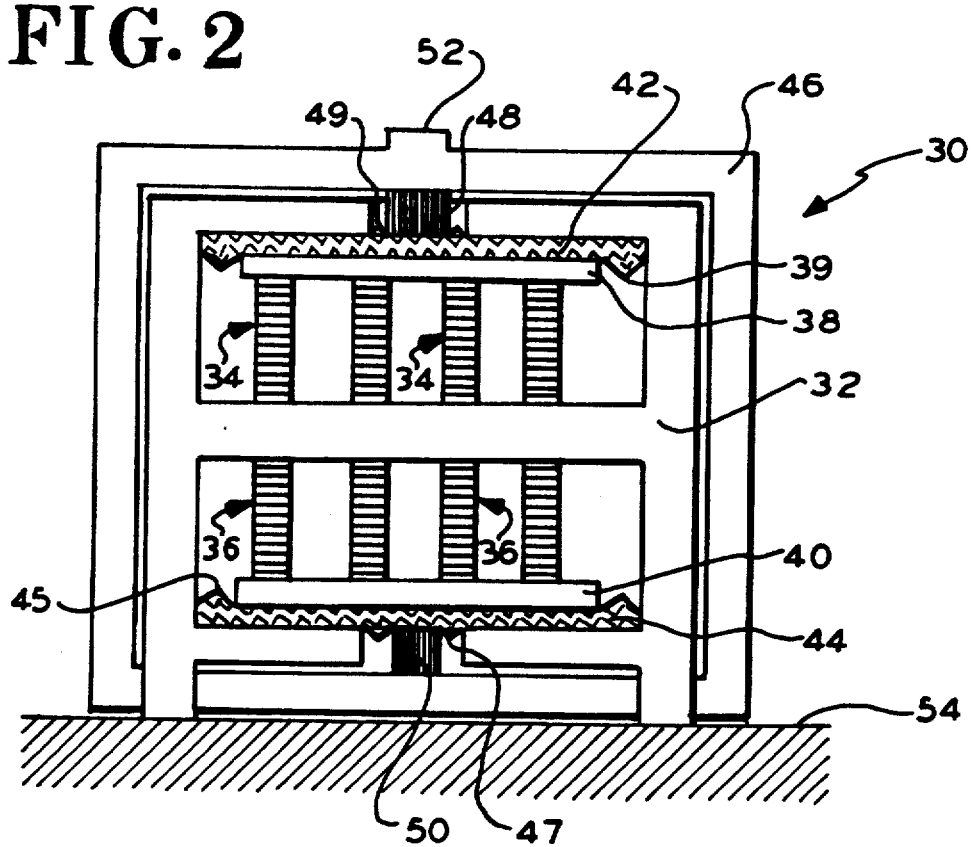
FIG. 2 is a side view in section showing another form of a hydraulic actuator capable of push-pull operation.

The actuator 10 shown in FIG. 1 is effective only for imparting forces where the piston 26 is being pushed against an object, due to the requirement that the fluid in the chamber 22 be compressed for the amplifier 10 to operate. In particular, it cannot be used to impart a retraction force, which must be provided by a spring or other mechanical means (not shown) which is biased against the outward movement of the piston 26. Where it is desired that push-pull operation be provided, a complementary hydraulic actuator arrangement such as that shown generally at 30 in FIG. 2 is required. Referring to FIG. 2, the push-pull actuator 30 is comprised of a first series of electrodistortive actuators 34 and a second series of electrodistortive actuators 36. Actuators 34 press against a large diameter piston 38 and actuators 36 press against a large diameter piston 40. A first fluid chamber or reservoir 42 occupies the space between frame 32 and the large diameter piston 38 and a second fluid chamber or reservoir 44 occupies the space between large diameter piston 40 and the frame 32. Seals 39 and 49 retain the fluid in first chamber 42 and seals 45 and 47 retain the fluid in second chamber 44. A moveable frame 46 is supported by a first small diameter piston 48 which preferably forms at least a portion of one wall of the reservoir 42 and by a second small diameter piston 50 which preferably forms at least a portion of one wall of the reservoir 44. Moveable frame 46 includes an attachment point 52 to which the reflecting surface of a deformable mirror (not shown) or other reflecting surface whose movement is to be influenced may be attached. Moveable frame 46 is free to move with respect to rigid frame 32 and the movement of frame 46 may be influenced by the selective elongation of actuators 34 or 36 by the application of electrical signals thereto.

When it is desired to move attachment point 52 away from the base 54, electrical signals are applied to actuators 34 which causes the piston 38 to press against the fluid in reservoir 42, displacing the small piston 48 outwardly from the reservoir 42. Simultaneously, a negative voltage is applied to actuators 36 to cause them to contract allowing expansion of the space available for fluid in reservoir 44, thereby permitting movement of small piston 50 into the reservoir 44. Reversing the bias on actuators 34 and 36 permits contraction of piston 48 into the reservoir 42 and the outward movement of reservoir 50 due to the movement of large diameter piston 40 against the fluid contained in reservoir 44.

While the hydraulic actuators shown in FIG. 1 and FIG. 2 have been described as being useful for movement of reflecting surfaces, for example in a telescope having a large number of segmented mirrors forming a common reflecting surface, or for use in selectively imparting distortions into the reflecting surface of the deformable mirror, it will be appreciated by those skilled in the art that the disclosed hydraulic actuators will find applications in areas outside that of movement of reflecting surfaces, for example, in operating control mechanisms such as valves or in positioning components. All such applications are intended to be included within the spirit of the disclosed invention and the breadth of the invention is only intended to be limited by the permissible scope of the appended claims.

We claim:

1. A hydraulic actuator for selectively adjusting the shape of the reflecting surface of a mirror, said hydraulic actuator being comprised of:
   a. a rigid frame having a central support;
   b. a first set of two or more electrodistortive actuators whose length may be changed by the selective application of an electrical signal to said actuators, each of said actuators having a first end fastened to the central support of said rigid frame;
   c. a second set of two or more electrodistortive actuators whose length may be changed by the selective application of an electrical signal to said actuators, each of said actuators having a first end fastened to the central support of said rigid frame and facing in a direction opposite to the direction in which said first set of actuators face;
   d. a first reservoir for containing a fluid;
   e. a second reservoir for containing a fluid;
   f. a first, moveable larger piston having a surface forming at least a portion of a wall of said first reservoir, said first larger piston being supported by said first set of electrodistortive actuators;
   g. a first, moveable smaller piston having a surface area smaller than the surface area of said first moveable larger piston, said first, moveable smaller piston forming at least a portion of another wall of said first reservoir;
   h. a second, moveable, larger piston having a surface area forming at least a portion of a wall of said second reservoir, said second larger piston being supported by said second set of electrodistortive actuators;
   i. a second, moveable, smaller piston having a surface area smaller than the surface area of said second moveable larger piston said second, moveable smaller piston forming at least a portion of another wall of said second reservoir; and
   j. a moveable frame fastened to said first moveable smaller piston and to said second, moveable smaller piston, said moveable frame having a point for attachment whereby said moveable frame may be moved in a first direction to influence the movement of the reflecting surface by the application of an electrical signal to said first set of actuators and in a second direction opposite to said first direction by the application of an electrical signal to said second set of actuators.

2. The hydraulic actuator of claim 1 wherein a portion of the walls of said first and said second reservoirs are formed by said rigid frame.

3. The hydraulic actuator of claim 2 wherein said moveable frame is supported away from said rigid frame by said first and said second smaller pistons.

4. The hydraulic actuator of claim 2 wherein said first and second larger pistons and said first and second smaller pistons have fluid-impervious seals contacting the walls of said first and said second reservoirs.

5. A deformable mirror comprised of:
A. A deformable reflecting surface for reflecting optical signals; and
B. Means fastened between said reflecting surface and a rigid surface for selectively imparting deformations into said reflecting surface, said means for imparting deformations being comprised of a reservoir for containing a fluid; a first moveable piston having a surface area forming at least a portion of a first wall of said reservoir; means fastened to said rigid surface for restraining movement of said reservoir against the movement of said first, moveable piston; two or more electrodistortive actuators whose length may be changed by the selective application of electrical signals to said actuator, a first end of each of said actuators being fastened to said rigid surface and a second end of each of said actuators being seated against said first piston; a second moveable piston fastened to said reflecting surface, said second piston having a surface area smaller than the surface area of said first piston, said second piston forming at least a portion of a second wall of said reservoir, and a fluid in said reservoir;

whereby the application of electrical signals to said electrodistortive actuators causes said first piston to press against the fluid in said reservoir thereby causing the fluid to move said second piston, the movement of said second piston causing the shape of the mirror's reflecting surface to be altered.

* * * * *